Sept. 20, 1960  J. F. ENGLER  2,952,961
MOWING DEVICE
Filed July 8, 1957  4 Sheets-Sheet 1
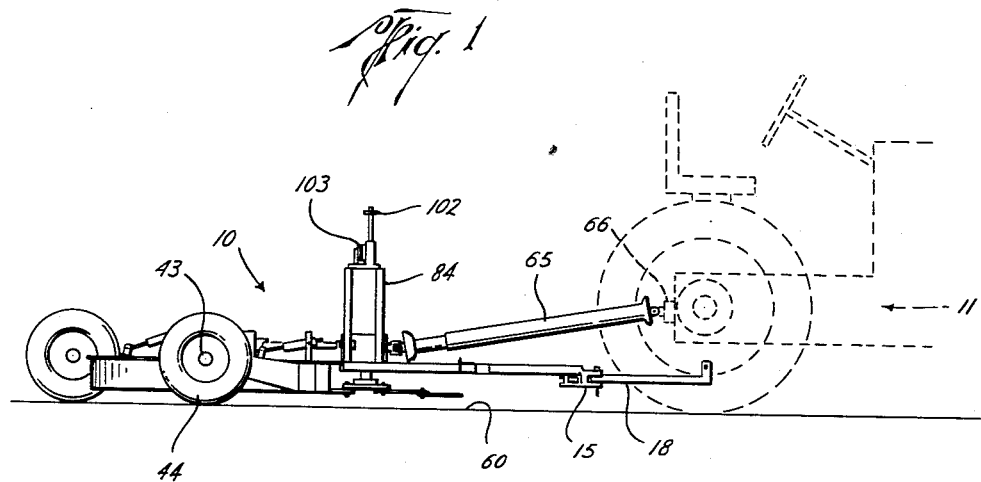
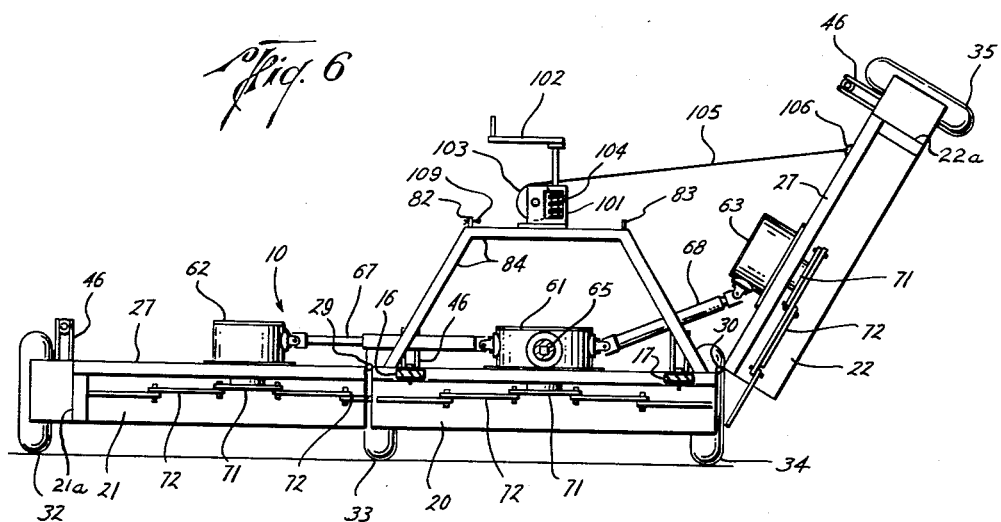
John F. Engler
INVENTOR.
BY Carl B. Fox, Jr.
ATTORNEY

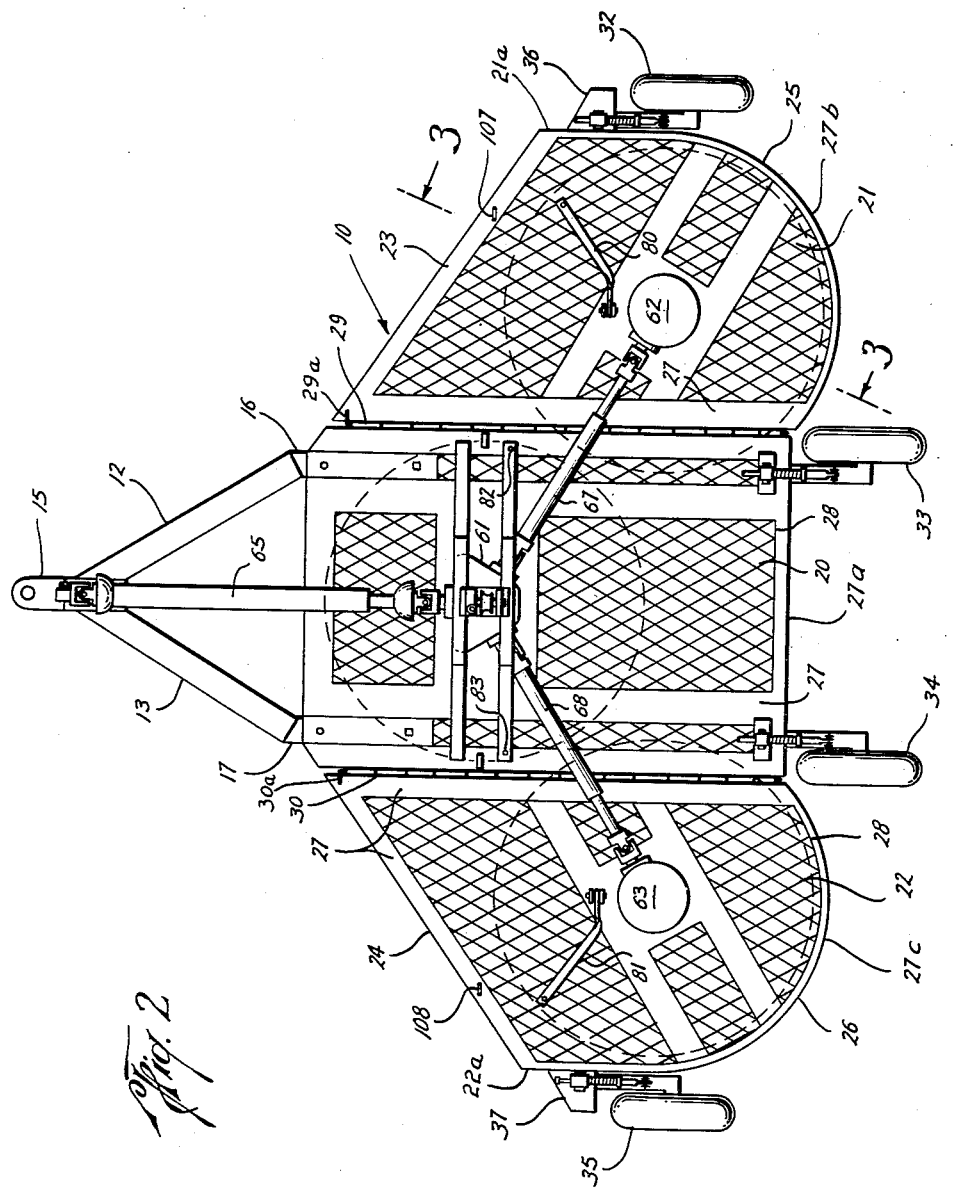

Sept. 20, 1960 J. F. ENGLER 2,952,961
MOWING DEVICE
Filed July 8, 1957 4 Sheets-Sheet 3
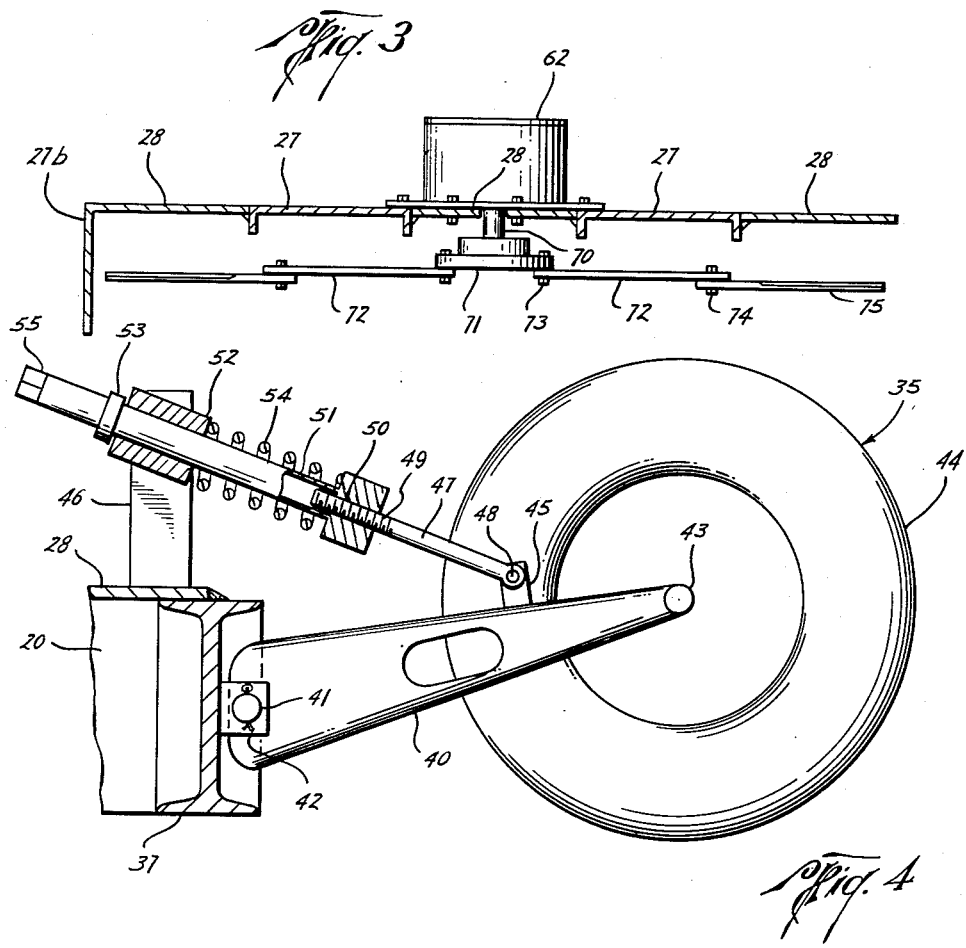
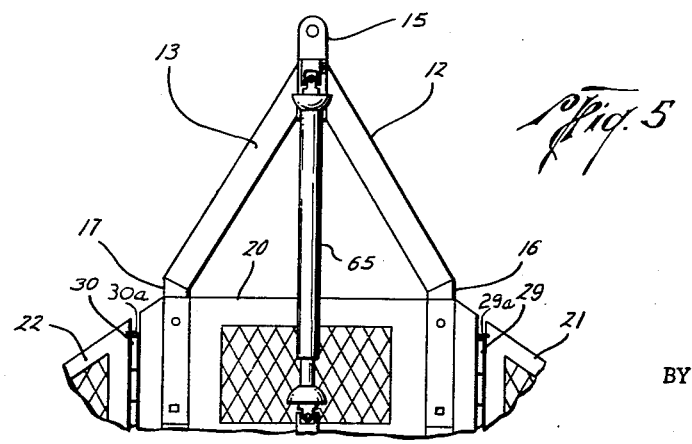
John F. Engler
INVENTOR.
BY Carl B. Fox, Jr.
ATTORNEY

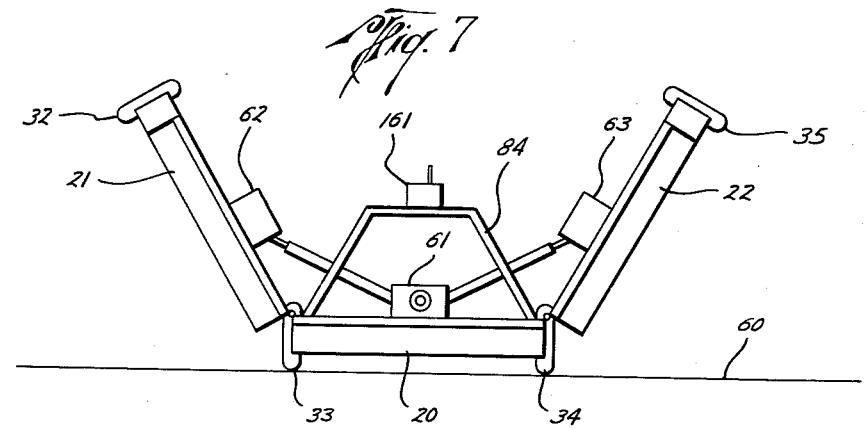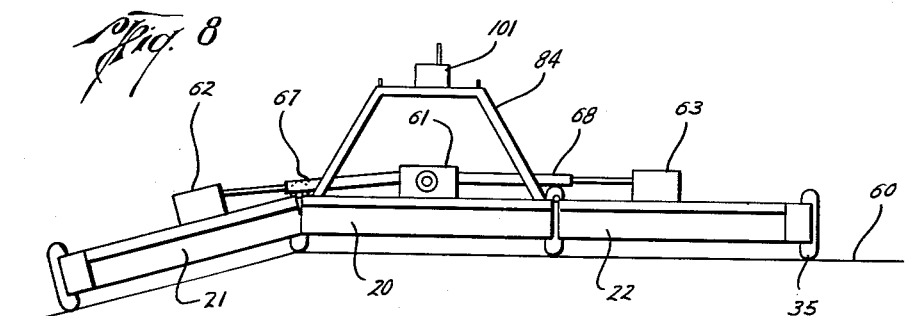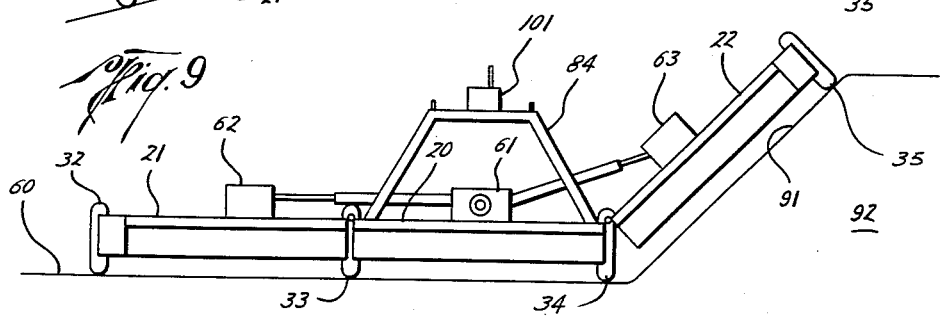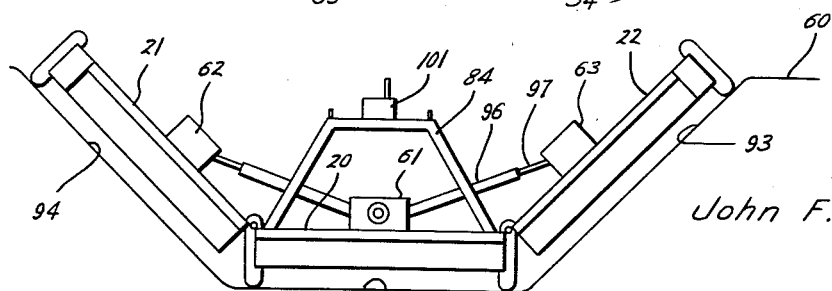

United States Patent Office 2,952,961
Patented Sept. 20, 1960

2,952,961
MOWING DEVICE

John F. Engler, % Specialty Manufacturing Company, 4408 Center St., P.O. Box 7616, Houston, Tex.

Filed July 8, 1957, Ser. No. 670,508

3 Claims. (Cl. 56—25.4)

This invention pertains to mowing apparatus, and particularly to combination mowing apparatus of large capacity wherein the width of swath for each pass is increased so that the costs of mowing large areas are significantly decreased.

It is a principal object of the invention to provide a mowing device or apparatus of large capacity.

Another object of the invention is to provide such apparatus having multiple overlappingly-disposed cutting means each contributing to the width of swath.

Another object of the invention is to provide mowing apparatus suitable for use on unlevel terrain such as, for example, rice paddies and other ditched fields.

Another object of the invention is to provide mowing apparatus capable of cutting a wide swath which may be towed by a vehicle of relatively low power.

An additional object of the invention is to provide such mowing apparatus which is not susceptible to stalling in heavy brush or bush, and which is relatively unaffected by impact or collision with impediments such as trees, rocks, stones, and the like.

Other objects and advantages of the invention will appear from the following description of a preferred embodiment thereof, reference being made to the accompanying drawings, of which:

Figure 1 is a side elevation of a preferred mowing device according to the invention and of a towing vehicle therefor, the latter being indicated by dashed lines;

Figure 2 is a plan view of the mowing device shown in Figure 1, the towing vehicle being omitted;

Figure 3 is a vertical section taken at line 3—3 of Figure 2;

Figure 4 is an enlarged partial view, partly in vertical section, showing the wheel mountings of the device of Figures 1–3;

Figure 5 is a partial plan view of the front end of the preferred device;

Figure 6 is a front elevation of the device showing a side portion thereof in moved position; and, Figures 7–10 are front elevations of the device showing how the device is used for cutting vegetation on terrain of different contour.

Referring now to the drawings in detail, and first to Figures 1–6, a mowing apparatus 10 of the preferred form according to the invention is towed or drawn by a powered vehicle 11 such as a tractor or the like. The tongue or draw bar assembly of the mowing device is made up of two angularly disposal channels 12, 13 which are welded together at their forward ends and to which an adjustable hitch means 15 is bolted at the apex. The channels 12, 13 are each welded angularly as shown to channels 16, 17, which are received into openings in the mower body, to be described, and are bolted therein. Powered vehicle 11 has a rear hitch means 18 engageable with the hitch 15 by means of which the connection is made for towing or drawing the mower 10 with the vehicle 11 in the conventional manner. Hitch 15 is adjustably connectable to hitch 18 to adjust the height of the front of the mower relative to hitch 18 both by inverting hitch 15 and 15 changing the position of hitch 15 on the mower tongue.

The body of the mowing apparatus 10 is in three sections 20–22, the center section 20 being substantially rectangular, and the side sections 21, 22 having diagonal forward sides 23, 24 respectively, and curved outer and rear sides 25, 26, respectively. Body sections 20–22 are upwardly flat, and are constructed of steel channel framing members 27 and steel flooring plate members 28. Sections 20–22 are hinge-connected together side by side, the hinge 29 pivotally connecting sections 20, 21 and the hinge 30 pivotally connecting sections 20, 22 at opposite sides of section 20. The hinges extend along the full length of the connected section sides, and permit relative movements between the connected sections of up to about 60° on upward movements and about 20° on downward movements so that the mower body is enabled to flexibly traverse over uneven terrain and still be closely spaced from all surfaces of the terrain.

The body sections 20–22 are movably supported by four wheel assemblies 32–35. Wheel assemblies 33, 34 are mounted near the rear ends of respective hinges 29, 30, and wheel assemblies 32, 35 are, respectively, at the outer sides 21a, 22a of body sections 21, 22 at channel brackets 36, 37 which extend out from the sides of the body sections a short distance so that the wheels are carried beyond the outer sides of the body sections. The placing of the outer wheel assemblies 32, 35 ahead of and out of line with wheel assemblies 33, 34 increases the stability of the mower body so that the evenness of cut is improved. The forward edges of channel brackets 36, 37 are outwardly and rearwardly angled, so that these brackets also function as guards for wheels 32, 35, to prevent the wheels from getting caught on stumps, rocks, etc.

Each of the wheel assemblies 32–35 is height adjustable. Referring particularly to Figure 4, each wheel assembly comprises an arm 40 pivotally mounted at a pin 41 supported stationarily by a perforate flange 42 welded to an I-beam bracket member 36 or 37 for wheel assemblies 32, 35, or to a frame member 27 for wheel assemblies 33, 34. Each arm 40 carries a lateral wheel shaft 43 (see Figure 1) upon which a wheel 44 is rotatively mounted, and a welded-on flange 45 above the arm and spaced from its pivot end. A double bracket 46 is welded above the plate 28 of body section 20 or above bracket 36 or 37 in line with each arm 40 and above the arm pivot. A rod 47 pivotally mounted at one end at flange 45 by a pin 48 is threaded at its other end 49. Threaded rod end 49 is adjustably screwed into an internally threaded socket 50 of a boss 51, which extends through a block 52 pin-mounted at bracket 46. Boss 51 has an enlarged flange 53 at the opposite side of block 52. The central cylindrical shank portion of boss 51 is tubular to receive the end of rod 47 and is slidable through a hole through block 52 and is surrounded by a helical compression spring 54 which acts between block 52 and the end of socket 50 which is of larger diameter than the shank portion of boss 51. Boss 51 has a hexagonal end 55 which may be engaged with a wrench to screw socket 50 axially along rod end 49 to adjust the distance between block 52 and pin 48, thereby raising or lowering arm 40 and the wheel 44 carried thereby. This adjustment permits variation of the distance at which body sections 20–22 are carried above the ground surface 60 so that the height of cut of the mower may be adjusted.

Each body section carries a swinging blade mowing assembly. Gear units 61–63 are mounted, respectively, at the centers of the upper surfaces of each of the body sections 20–22, the units being bolted to floor 28 and frame members 27 as shown. Gear unit 61 is driven through a rod and coupling assembly 65 which is also connected to the rotative power take-off 66 of vehicle 11, which is usually a small tractor. Gear unit 61 in turn drives gear units 62, 63 to which it is drive-connected by universal telescoping rod and coupling assemblies 67, 68, respectively.

Each gear unit 61–63, unit 62 being shown in Figure 3 and units 61, 63 being identically arranged, includes a vertical shaft 70 extending through a hole freely past and below the floor element 28 of the body section. At the lower end of each shaft 70 there is connected a circular hub 71 outwardly from the lower surface of which extend two doubly-pivotal cutter or mower blades 72. Each blade 72 is pivotally mounted for horizontal movement both at the hub 71, at bolts 73, and at the intermediate joint thereof, at bolts 74. The outer blade sections 75 of each blade 72 are sharpened at each side for cutting of grass, roots, stems, and brush or other vegetable growths when the blades are swingingly rotated by axial rotation of hub 71.

Around the side and rear portions of the mower, that is, around the back and outer side of each side body section 21, 22, and at the back of center body section 20, the channel frame members 27 are disposed with their concave side facing outwardly to form a skirt 27a, b, c extending downwardly from the flat upper portions of the body sections. The skirt functions both as a guard for preventing contact with the blades and subsequent accidental injury, and also to cause a degree of mulching or shredding of the mowed vegetable growths by retaining same in the areas of blade rotation until the size of the mowed vegetable growths is reduced to allow it to pass beneath the lower edge of the skirt.

Pivotally carried on the upper surfaces of floors 28 of body sections 21, 22 are two lock bars 80, 81 (see Figure 2), each of which is perforated at its free end for engagement over one of the vertical pins 82, 83 (see Figure 6) which are carried at the upper end of an angle iron frame 84 welded to members 27 at each side of body section 20 and being disposed above the central gear box 61. The lengths of bars 80, 81 are such that the perforate ends engage the pins 82, 83, respectively, when the side body sections 21, 22 are angularly elevated to a vertical position, to hold the side body sections thus elevated when the mowing device is to be moved along a restricted path, as for example along a road, through a gate or door, or the like. The shafts 67, 68 must be uncoupled for the mower side portions to be moved to the vertical position.

A winch 101 is provided for angularly raising sides 21, 22 so that the bars 80, 81 may be engaged with pins 82, 83. The winch is conventional, and has handle 102 geared to drum 103 through suitable gears 104 to reduce the torque at handle 102. A cable 105 wound on drum 103 has end loop 106 for engaging either hook 107 on side section 21 or hook 108 on side section 22 to raise each side. Winch 101 is of the worm gear type so that there is no danger of accidental dropping of the side sections. The bars 80, 81 are held on the pins, 82, 83 by cotterpins 109 which are inserted through holes near the tips of the pins after the bars are in place thereon. Cable 105 may be wound completely onto drum 103 when not in use so as to be out of the way.

The preferred mowing device herein described is particularly suited for use in mowing unlevel ground such as is found in rice fields and other terrain interwoven by ditches and other surface irregularities. In Figure 10, the flexible action of the mower is shown in traversing a ditch 90, and in Figure 9 the side 91 of a hump or hill 92. The ditch 90 in Figure 10, has steep sides 93, 94, at angles shown as 45°, but which may be as great as 60° with the horizontal bottom of the ditch as is shown by the positions of the mower sides in Figure 7. The powered vehicle 11 (not shown in Figure 10) rides the ditch bottom. The center part 20 of the mowing device closely cuts vegetable growth at the bottom of the ditch, while the side parts 21, 22 closely mow the ditch sides 93, 94. All of the vegetation at the sides and bottom of the ditch is trimmed closely, since the non-plane configuration taken by the mower body sections 20–22 is closely adapted to the configuration of the ditch opening.

In Figure 8, the mower is shown with right-hand side section 22 and center section 20 mowing level terrain, and with the left-hand section 21 mowing a slope 20° downward from the level terrain, which is about the maximum downward movement permitted by the position of shaft 67.

In Figure 9, it is seen that mower body section 22 has moved from its planar position of level ground mowing, as shown at the right-hand side of Figure 8, to adapt to the hill 92, while the other body sections 20, 21, unaffected, continue mowing at a horizontal plane. This versatility enables the mower to be used in many locations not heretofore capable of being mowed except by more laborious means, as for example by several passes with a narrower mowing device cutting vegetation at a single plane. Further efficiency is realized because of the controlled overlapping of cut of adjacent sections 20, 21, 22. When separate passes are made with a single-cutter mower, the overlapping is uncontrolled and invariably exceeds the controlled overlapping so that some capacity of the mower is wasted at the sides of each pass.

While a mower capable of cutting a fifteen foot wide swath might be thought unmanageable, such is not the case with the mower herein presented. Because of the simple direct means for supplying driving power to each set of blades of the mower, there is little friction loss so that a greater fraction of the power of vehicle 11 is available for performing useful work. It is to be understood that the work load is a combination of the work done in rotating the cutters to cut the vegetation and the work done in pulling the mower which includes the work of bending over the vegetation as the mower passes over it and also the work of lifting the mower over any hills or other obstacles, especially where the terrain is rough. It has been deemed impossible to operate such a mower with a tractor powered with less than about 60 horsepower, but according to the realization of this invention, a 30 horsepower tractor is fully capable of efficient operation even under adverse conditions of heavy vegetation and rough terrain. Under favorable conditions such as in a pasture even a 20 horsepower tractor can be used.

The telescoping drive shafts 67, 68 each have a tubular portion 96 within which a portion 97 is slidingly disposed and keyed (keys not shown) to prevent relative rotation between the portions 96, 97 of each shaft. The length of the portion 97 which is within portion 96 is variable, depending on the inclination of the side section 21 or 22 relative to the center section 20. The drive between gear units 61 and gear units 62, 63 is direct regardless of whether the shafts are extended, as in Figure 8, or shortened, as in Figures 9–10. The absence of low-efficiency drive connections, such as belts or pulleys, between the adjacent mowing sections makes the power efficiency of the gang-mower very high so that the low powered tractor units above-referred to may be used with no deficiency of operating efficiency for the mower. It should be further noted that the drive-efficiency is the same whether the mower is operating on level or unlevel ground.

In addition the diagonal disposition of the channels 12, 13 and the angular configuration of front sides 23, 24 of the side sections 21, 21 lessens the shock to the mower should a relatively immovable or heavy object such as a tree, post, log or stone be struck while the mower is being towed. The described shapes of the front portions of the mower permit the vehicle 11 to drag the mower past such objects without back and forth maneuvering of the vehicle and mower. The slanted front sides of the mower, when striking an object, cause the mower to slide sideways around the object and continue without hesitation along the swath.

The controlled blade overlapping is best described by reference to Figure 2. The center blades, beneath section 20 and gear unit 61 is between and forward of the two sets of side blades beneath sections 21, 22 and gear units 62, 63, respectively. This triangular arrangement permits controlled overlapping from front to back of adjacent sets of blades. This controlled overlapping exists at side-section angles up to about 45° (see Figures 8, 9, 10), but when the side-section angle is greater than about 45° (see Figure 7), there is a narrow gap between adjacent blade tips.

Referring now again to Figure 2, with continuing reference to the other drawings, the mower may also be adapted for use in mowing narrow swaths, and as an "offset" mower for mowing beneath the branches of trees and other overhanging objects. For example, if the pin or rod of hinge 30 is withdrawn, side section 22 may be removed. It is also necessary to uncouple shaft 68. The mower then becomes an offset mower with the offset portion comprising section 21 of the mower.

Hinges 29, 30, as is most clearly shown in Figures 2 and 5, are of the type having serially aligned perforate parts alternately carried on each of the mower parts to be pivotally joined by the hinge, and having an elongate pin 29a, 30a inserted through the perforations to prevent separation of the mower parts. The pins may be removed if it is desired to separate the mower parts. Since hinges of this type are well known in the art, being commonly referred to as "piano hinges," and since the exact form of the hinges is immaterial to the invention, no further description of the hinges is necessary to enable practice of the invention. Similarly, left-hand section 22 may be used as an offset, section 21 being removed by withdrawing the pin from hinge 29 and uncoupling shaft 67. Also, both side sections may be removed to provide a narrow single drag-type mower comprising only central section 20. The width of the swath cut may, therefore, be changed to the width of either one, two, or three sections of the mower, and an offset mower of two section width comprising the center section and either of the side sections may be used as desired.

While a preferred embodiment of the invention has been shown and described herein, many modifications thereof may be made by a person skilled in the art without departing from the spirit of the invention, and it is intended to protect by Letters Patent all forms of the invention falling within the scope of the following claims:

1. A mowing device comprising a three part body having each said part in planar form, one said body part being substantially horizontally and centrally disposed, and the other two said body parts being disposed at the opposite lateral sides of said one body part, hinge means pivotally connecting adjacent sides of said body parts and permitting relative movement of adjacent body parts to positions angularly disposed with relation to each other to permit longitudinal movement of said mowing device along non-level terrain with each body part substantially parallel to the terrain surface, means on said centrally disposed body part for pivotally raising each of said other two body parts about said hinge means to substantially vertical position, cutter blade means supported therebeneath and above ground level by each of said body parts, vertically adjustable spaced dual wheel support means on said centrally disposed body part and rearwardly thereof, a single vertically adjustable wheel support on each of said other two body parts and disposed laterally outwardly therefrom supporting the outer side of each of said other two body parts at points forward of said dual wheel support means, an outwardly and rearwardly angled guard in front of each of said wheel support on said other two body parts, power transmission means including telescoping means on said mowing device and operably attached to said cutter blade means for driving said cutter blade means, means on said centrally disposed body part for connecting said mowing device to a powered vehicle having a power take-off and for being drawn thereby, and a telescoping drive shaft on said mowing device operably attached to said power transmission means and adapted to be driven by said power take-off, each of said hinge means including a removable pin whereby said other two body parts may be removed from said centrally disposed body part.

2. A mowing device comprising a planar body, said planar body comprising three substantially equal sections hinged together by disengageable hinges between adjacent sections extending in the direction of travel of the device, whereby the side sections are pivotable vertically about said hinges, means on the body adapted to elevate the side sections, vertically adjustable wheels carried by said body near the position of each hinge and at the lateral sides of said body for rollably supporting said body at a predetermined distance above the ground surface and parallel to the ground surface, rotatable blade means carried beneath each said section and above ground level, a vertical shaft extending through each body section operably attached to said blade means, the wheels at the lateral sides of the body being positioned forwardly of the wheels near the position of the hinges and substantially in alignment with the vertical shafts in the side sections, means on said body and extending forwardly therefrom whereby said device may be towed by a powered vehicle having a power takeoff, a telescoping drive shaft on said body adapted to be operably attached to said power takeoff, and power transmission means including telescoping means on said body and operably attached to each of said vertical shafts.

3. A mowing device comprising a planar center body and two planar side bodies, the two side bodies being disposed at opposite lateral sides of the center body, hinge means pivotally connecting adjacent sides of said bodies and permitting relative movement of adjacent bodies to positions angularly disposed with relation to each other to permit longitudinal movement of said mowing device along non-level terrain with each said body substantially parallel to the terrain surface, center cutter blade means supported beneath the center body and above ground level, a single side cutter blade means supported beneath each side body and above ground level and positioned rearwardly of the center cutter blade means, each said cutter blade means being rotatably mounted to swing in a plane substantially parallel to the plane of the bodies, the side cutter blade means being positioned on a line substantially perpendicular to the path of travel of the mowing device and laterally spaced from the center body sufficiently far to prevent overlapping of the cut of the side cutter blade means with the cut of the center blade means and to cause overlapping of the swaths cut by said cutter blade means upon longitudinal movement of said mowing device, vertically adjustable wheel support means on said center body and rearwardly thereof adjacent each said hinge means, a single vertically adjustable wheel support on each side body disposed laterally outwardly thereof and forwardly of the center body wheels and substantially on the line on which said side cutter blade means are positioned, whereby the side wheels will traverse substantially the same contour of the ground at substantially the same time as the side cutter blade means, so that the evenness of cut of the side blade cutter means is substantially independent of undulations of the ground, means extending forwardly of the center body adapted to be connected to a powered vehicle having a power takeoff, for drawing said mowing device, power transmission means on each said body connected in driving relation to said power takeoff and to each said cutter blade means, and an outwardly and rearwardly angled guard in front of each of the wheel supports on said side sections.

References Cited in the file of this patent

UNITED STATES PATENTS

| | | |
|---|---|---|
| 647,535 | Smith | Apr. 17, 1900 |
| 1,693,475 | Clapper | Nov. 27, 1928 |
| 2,682,740 | Miller et al. | July 6, 1954 |
| 2,743,567 | Martin | May 1, 1956 |
| 2,753,674 | Cunningham et al. | July 10, 1956 |
| 2,801,510 | Colburn | Aug. 6, 1957 |

FOREIGN PATENTS

| | | |
|---|---|---|
| 416,140 | Great Britain | Sept. 13, 1934 |